May 30, 1950          A. M. YOUNG          2,510,006
ROTATING WING AIRCRAFT
Filed April 5, 1946          2 Sheets—Sheet 1
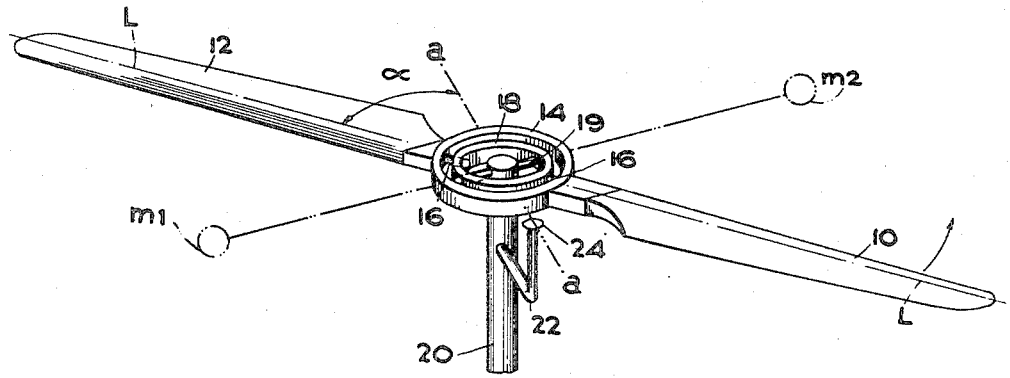
Fig. 1.
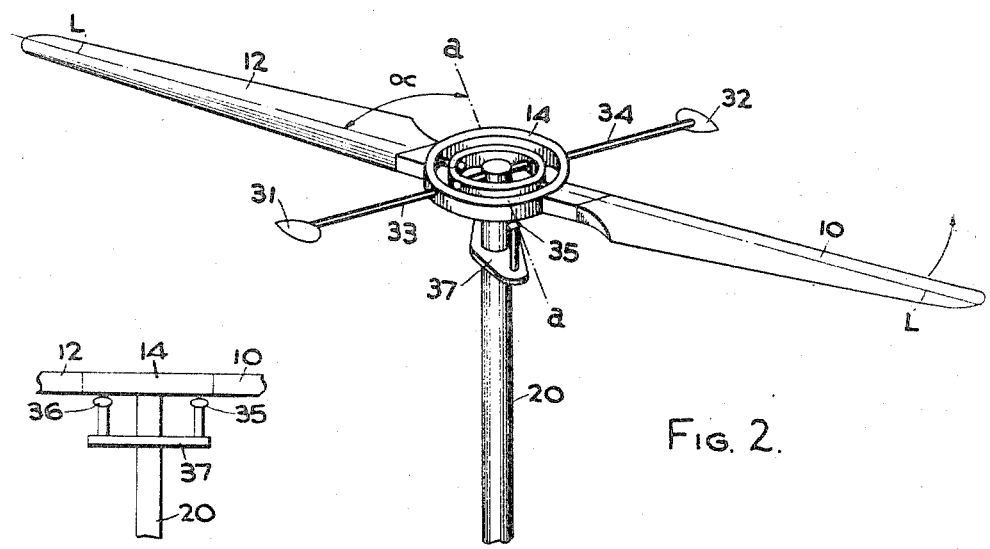
Fig. 2.
Fig. 3.
INVENTOR
*Arthur M. Young*
BY
*Beau, Brooks, Buckley & Beau*
ATTORNEYS

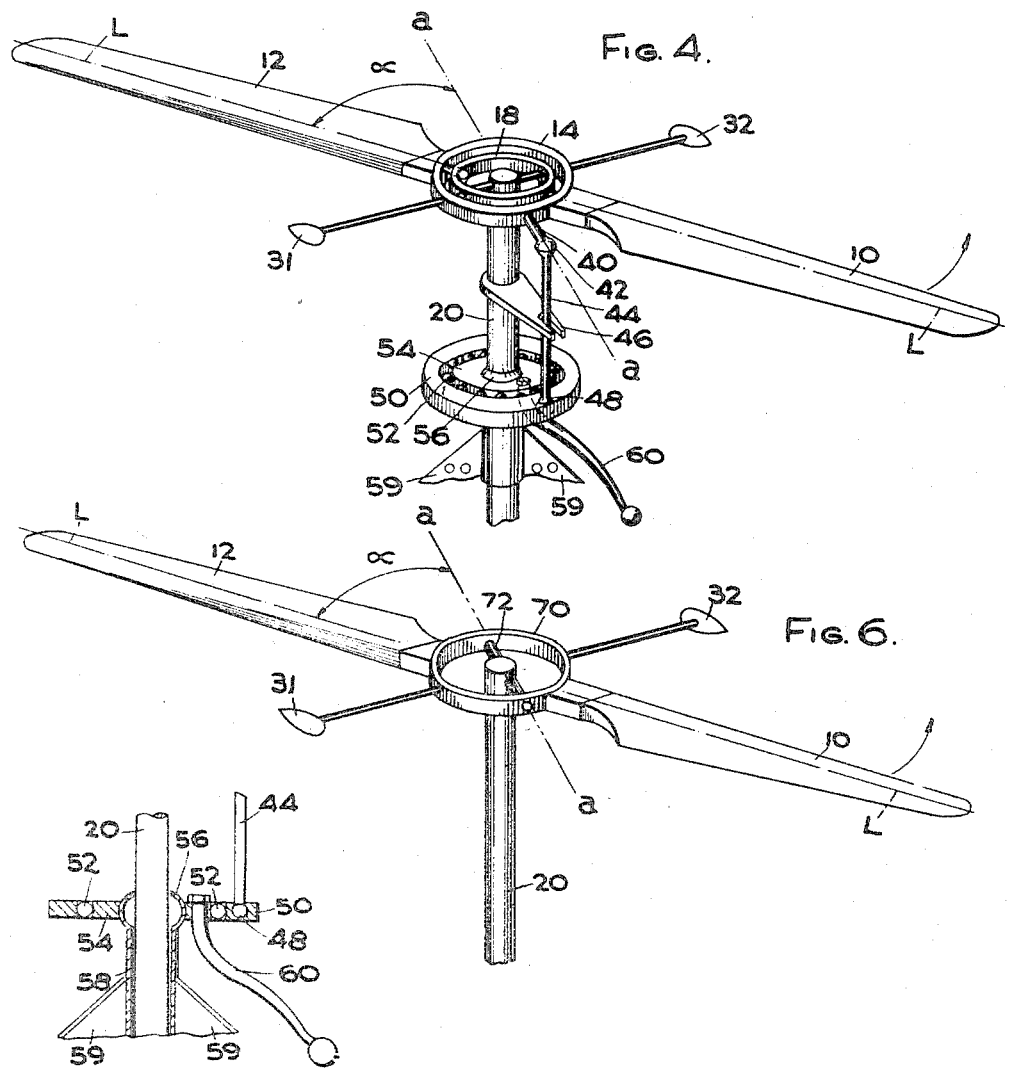

Patented May 30, 1950

2,510,006

UNITED STATES PATENT OFFICE 2,510,006

ROTATING WING AIRCRAFT

Arthur M. Young, Buffalo, N. Y., assignor to Bell Aircraft Corporation, Buffalo, N. Y.

Application April 5, 1946, Serial No. 659,905

5 Claims. (Cl. 170—160.13)

This invention relates to rotary wing aircraft, and more specifically to rotor control means for helicopter aircraft and the like.

One of the objects of the invention is to provide an improved rotor mounting and control arrangement whereby the degree of flapping of the rotor is limited while avoiding undue stressing of the rotor mast and blade structures.

Another object of the invention is to provide a helicopter aircraft wherein the rotor is self-stabilizing relative to the aircraft.

Another object of the invention is to provide a rotor which will not incur inclination of the blade tip path plane due to transverse airflow.

Another object of the invention is to achieve the objects set forth hereinabove by means of a rotor control mechanism wherein the lift forces tending to displace the rotor are employed to effect counter-control thereof, as distinguished from a mechanism which initially permits actual displacements of the blade tip path plane and then translates such displacements into control effects countering the tendency of the rotor to further incline (such as in my earlier Patent No. 2,256,635).

Other objects and advantages of the invention will appear from the specification hereinafter.

In the drawing:

Fig. 1 is a diagrammatic illustration in perspective of a dual blade rotor mounting and flapping control means of the invention;

Fig. 2 is a similar view of another form of rotor and control means of the invention;

Fig. 3 is a fragmentary side elevation of the rotor hub and flapping control arrangement of Fig. 2;

Fig. 4 is a view similar to Fig. 2, but showing another form of rotor control means of the invention;

Fig. 5 is a fragmentary sectional view through a portion of the rotor control arrangement of Fig. 4; and Fig. 6 illustrates still another form of rotor mounting and control means of the invention.

The present invention contemplates a rotor of either the single blade or diametrically opposed dual blade type mounted upon an aircraft body by means of a connection device permitting universal inclination of the rotor. In either case the rotor and the hub mounting unit constitutes a dynamic system having mass along the blade longitudinal axis and along the blade short axis or chord axis. For example, as illustrated in Fig. 1, the rotor may comprise paired blades 10—12 rooted upon an annular hub 14 which is pivotally mounted by means of diametrically opposed pins 16—16 upon a gimbal ring 18. The ring 18 is in turn carried upon a pin 19 having its axis disposed transversely of the aligned axes of the pins 16—16; and the pin 19 is carried by the upper end of the rotor drive shaft 20. Thus, it will be appreciated that the blades are driven to rotate by the shaft 20 while the rotor blade and hub unit is free to incline in any direction relative to the shaft 20; and that the blade-hub unit may be diagrammatically represented to have chordwise disposed masses as represented at $m_1$—$m_2$.

The shaft 20 carries a rotor flapping limit or stop device 22 which is illustrated to comprise an L-shaped bracket fixed at one end to the rotor drive shaft 20 so as to rotate therewith while extending radially therefrom and then terminating in an upwardly presented abutment portion 24 which is thereby disposed just below the hub 14 at a position behind the rotor blade 10 as along an axis $a$—$a$ which intersects the axis of the shaft 20 and is angularly offset from the rotor blade longitudinal axis L—L so as to define an angle $\alpha$ therebetween. The stop device is preferably arranged so that the angle $\alpha$ is at least 5° and it may theoretically be as much as 90°; although values of over 45° for the angle $\alpha$ will provide increasingly diminishing return from the standpoint of effectiveness. Therefore it will be understood that the value of angle $\alpha$ will be regulated to provide the desired degree of control sensitivity for the system, as will be explained more fully hereinafter.

The rotor mounting and flapping control arrangement of Fig. 1 is adapted to function automatically to limit the flapping of the rotor while avoiding undue stresses in the rotor and/or hub and mounting mechanisms. For example, whereas the rotor mast or drive shaft is normally disposed in vertical attitude and the rotor is turning thereon in undisturbed state, if the rotor shaft is then caused to incline upwardly toward the blade 10 as viewed in Fig. 1 the stop abutment 24 will be thereby elevated relative to the hub 14 at a position just behind the root of blade 10. If the disturbance causing such shifting of the rotor shaft relative to the blade structure is sufficient to cause the abutment 24 to contact and to bear upwardly against the hub 14, such impact of the stop device against the hub will provide a force tending to twist the hub upon the pins 16—16 so as to impart an upward acceleration to the mass $m$—$1$ and to shift its plane of rotation so as to be inclined relative to the initial attitude thereof. This effect occurs because the spanwise mass of the rotor structure is invariably much greater than the chordwise mass thereof.

In accordance with laws governing rotating masses the maximum displacement of the plane of rotation of a mass occurs at a position 90° later than the position of the application of the displacing impact. Therefore when the blade 12 reaches a 90° advanced position relative to its position at the time of the displacement impact it will have an increased angle of attack which will automatically increase the lift forces acting thereon, thereby causing the blade 12 to rise during the next 90° quadrant of its rotation. Hence, when the blade 12 reaches the position occupied by blade 10 in Fig. 1, the blade 12 will be at an elevation above the elevation of blade 10 as shown in Fig. 1 and will have lifted itself away from the stop abutment 24; and this mode of control action will continue so as to in effect maintain the rotor tip path plane substantially perpendicular to the shaft 20.

Referring further to the operation of the invention, it may be explained that if the stop device 24 were to be located so as to contact the hub in the quadrant ahead of the leading edge of blade 10, instead of behind the trailing edge thereof, the chain of events resulting from impact of the stop device against the hub would be of destabilizing nature and would result in digression of the rotor tip path plane from perpendicularity with respect to the rotor shaft 20.

In some instances of application of the invention to helicopter aircraft it may be desirable to mount auxiliary weights upon the rotor structure approximately at the positions occupied by the diagrammatic masses $m_1$—$m_2$ in Fig. 1, in order to arrange for control effects of the invention to occur at practical speeds of rotor rotation. For example, Figs. 2 and 3 illustrate a rotor structure and control system which embodies the principles of Fig. 1 but employs auxiliary masses indicated at 31—32 which are carried upon corresponding struts 33—34 extending in diametrically opposed relation from the hub 14 in a direction transverse to the longitudinal axis of the rotor blade structure. Thus, the chordwise inertia of the rotor blade system is increased, and the stability of the rotor system in its plane of rotation will be thereby correspondingly increased.

As illustrated more clearly in Fig. 3, in actual practice a pair of stops as illustrated at 35—36 will be arranged to extend upwardly from opposite ends of a cross bar 37 carried by the rotor drive shaft to more effectively achieve the purpose of the invention.

The distance between the stop abutments and the rotor hub is preferably regulated so as to give the rotor a limited degree of independence relative to the mast, whereby slight rocking motions of the mast may be experienced while the rotor maintains a horizontal plane; but whenever a more severe tilting of the mast occurs the rotor is guided by means of the automatic control arrangement of the invention to maintain substantial perpendicularity with the mast.

Whereas in the applications of the invention hereinabove described the axis of rotor restraint $a$—$a$ was positionally fixed relative to the mast and its rotation defined a plane disposed perpendicular to the mast. Figs. 4 and 5 illustrate an application whereby pilot control means is provided to incline this plane of rotation, whereby the aircraft pilot may steer the aircraft in any desired direction by controlling the direction of the lift vector of the rotor. As illustrated in Figs. 4 and 5, the hub 14 is equipped with a radially extending control arm 40 which connects by means of swivel connection device 42 to the upper end of a control strut 44 disposed parallel to the rotor mast 20. A fork 46 is also carried by the mast 20 to rotate therewith and extends radially thereof to clasp in loose fitting relation about the control strut 44 so as to cooperate with the arm 40 in guiding the strut 44 to revolve with the mast 20 while remaining parallel therewith. At its lower end the strut 44 connects by means of a swivel connection device 48 to the outer race 50 of a swash plate device having bearings 52 and an inner ring 54 which is centrally socketed so as to fit in universally inclinable relation upon a ball-shaped portion 56 of a tubular casing 58. The casing 58 encircles the lower end of the rotor mast 20 and is flanged as at 59 for connection to any suitable stationary structure of the mounting aircraft, and is therefore adapted to function as a support bearing for the rotor mast 20.

A stick 60 is rigidly connected to the inner race 54 to extend downwardly and outwardly therefrom for manual manipulation by the aircraft pilot for shifting the plane of the swash plate device in any desired direction. Thus, the aircraft may be steered into any course desired while embodying the automatic stability and flapping control features referred to hereinabove.

It may be mentioned that whereas in the control system of my prior Patent No. 2,384,516 the pilot control motions cause precession of the stabilizing horizon and hence incline the rotor, a 90° lag occurs therein between the direction of the pilot-imposed forces and the resultant displacement of the inertia means and the rotor. As distinguished from the above, in the case of the present invention the direction of inclination of the rotor blade tip path plane is the same as the direction of the pilot imposed control forces. Therefore, the present invention constitutes a totally new method of control of a rotor that is stabilized with an artificial horizon; and a major feature of the present invention is that the control effects thereof are in proportion to the control forces which are imposed by the pilot upon the control stick, and this feature is lacking in the arrangement of my prior U. S. Patent No. 2,368,698 in which control displacements and not control forces regulate the rotor position.

Fig. 6 illustrates another application of the invention to a dual bladed rotor which includes a hub 70 pivoted upon the upper end of the drive shaft or mast 20 by means of a cross pin 72. The pin 72 extends along an axis $a$—$a$ which is at an angle $a$ to the spanwise axis of the rotor blade structure and corresponds to the angle $a$ of Figs. 1–4; and weight masses may be employed if desired at 31—32 as in the cases of Figs. 2–4 to augment the chordwise mass of the blade structure as explained hereinabove. It is to be understood that in the case of any application of the invention the chordwise mass of the blade structure may be supplemented if desired by any suitable means as explained hereinabove or for example by employing a more massive hub arrangement, or by any other suitable method which may be preferred. The operation of the mechanism of Fig. 6 may be illustrated for example by assuming the mast 20 to tip upwardly toward the position of blade 10 as shown in Fig. 6. The trailing weight mass 31 will thereupon be pushed up and will reach the top of its rise at a position 90° later in its orbit of rotation, thereby increasing the angle of attack of the blade 12 in such manner that when the blade 12 reaches the position of blade 10 as shown in Fig. 6 the blade 12 will have an elevation above the elevation of the blade 10 as shown in Fig. 6; and the rotor will therefore follow the inclination of the mast which initiated the control effects described.

It is to be understood that to permit the control mechanism of the invention to function properly a certain speed of rotor rotation must be maintained, depending upon the chordwise mass of the blade structure and the angle of the axis $a$—$a$ relative to the long axis $L$—$L$ of the blade structure. In fact, when the rotor is moving at less than the necessary speed or is stationary, the linkage controlling the blade mechanism tends to destabilize the blade. For example, referring again to Fig. 6 and assuming that the rotor is stationary, in the event a transverse wind impinges against blade 10 and causes it to lift and pivot around the axis $a$—$a$, the resulting increase in angle of attack of blade 10 will induce a more violent lifting of the blade and the rotor will tend to flop over until blocked by interferences of the blade structure with fixed portions of the aircraft. However, whenever the rotor is stationary the danger of over-stressing the mast and/or rotor structure in this manner is minimized.

Thus, it will be appreciated that the invention provides protection for the rotor mast and blade structure against excessive shocks and/or bending loads such as normally result from excessive flapping of the blade structure under rotor operative conditions, and also provides the rotor to be self-stabilizing relative to the aircraft and avoids inclination of the rotor blade tip path plane due to transverse airflow.

It will also be understood that whereas only a few forms and applications of the invention have been illustrated and described in detail hereinabove the invention is not so limited but that various changes may be made therein without departing from the spirit of the invention or the scope of the appended claims.

I claim:

1. In a rotating wing aircraft, a rotor shaft and a rotor comprising a blade and means universally mounting said blade on said shaft for rocking relative thereto responsive to changing forces on the aircraft, and control means for causing the blade to rock relative to the shaft about an axis extending behind and at an acute angle to the trailing edge of the blade, said control means comprising a member rotating with said shaft for exerting force against said rotor in opposition to the rocking thereof in any direction other than about said axis.

2. In a rotating wing aircraft, a rotor shaft and a rotor comprising a blade and means universally mounting said blade on said shaft for rocking relative thereto responsive to changing forces on the aircraft, and control means for causing the blade to rock relative to the shaft about a rocking axis extending behind and at an acute angle to the trailing edge of the blade, said control means comprising a member fixed to and rotating with said shaft and positioned to abut against said rotor at a position thereon circumferentially displaced less than 90° rearwardly from the spanwise axis of said blade in view of the direction of the rotor rotation in opposition to the rocking thereof in any direction other than about said rocking axis.

3. In a rotating wing aircraft, a rotor shaft and a rotor comprising a hub having a pair of blades extending diametrically therefrom and means universally mounting said hub on said shaft for rocking relative thereto responsive to changing forces on the aircraft, and control means for causing the rotor to rock relative to the shaft about an axis extending behind and at an acute angle to the trailing edge of the blade, said control means comprising a pair of diametrically opposed abutments fixed to and rotating with said shaft for exerting force against said rotor in opposition to the rocking thereof in any direction other than about said axis.

4. In a rotating wing aircraft, a rotor shaft and a rotor comprising a blade and means universally mounting said blade on said shaft for rocking relative thereto responsive to changing forces on the aircraft, and controllable means comprising a member rotating with said shaft for exerting force against said rotor in opposition to the rocking thereof in any direction other than about said axis, and pilot adjustable means connected to said controllable means for displacing the position thereof in directions axially of said shaft.

5. In a rotating wing aircraft, a rotor shaft and a rotor comprising a hub and a pair of blades extending in diametrically opposed relation from said hub and means universally mounting said hub on said shaft for rocking relative thereto responsive to changing forces on the aircraft, and control means for causing the rotor to rock relative to the shaft about an axis extending behind and at an acute angle to the trailing edge of the blades, said control means comprising a member rotating with said shaft for exerting force against said rotor in opposition to the rocking thereof in any direction other than about said axis, and pilot adjustable means connected to said member for adjustably displacing the latter in directions axially of said shaft.

ARTHUR M. YOUNG.

REFERENCES CITED

The following references are of record in the file of this patent:

UNITED STATES PATENTS

| Number | Name | Date |
| --- | --- | --- |
| 2,110,638 | Synnestvedt | Mar. 8, 1938 |
| 2,151,215 | Larsen | Mar. 21, 1939 |
| 2,256,635 | Young | Sept. 23, 1941 |
| 2,271,473 | Bennett | Jan. 27, 1942 |
| 2,368,698 | Young | Feb. 6, 1945 |
| 2,369,048 | Hays | Feb. 6, 1945 |
| 2,384,516 | Young | Sept. 11, 1945 |
| 2,388,653 | Hays | Nov. 6, 1945 |
| 2,396,038 | Bossi | Mar. 5, 1946 |

FOREIGN PATENTS

| Number | Country | Date |
| --- | --- | --- |
| 303,819 | Great Britain | Jan. 7, 1929 |